United States Patent [19]

Schotter

[11] Patent Number: 5,005,930

[45] Date of Patent: Apr. 9, 1991

[54] MULTI-DIRECTIONAL PAYOUT FIBER OPTIC CANISTER

[75] Inventor: Daniel K. Schotter, Tucson, Ariz.

[73] Assignee: Hughes Aircraft Company, Los Angeles, Calif.

[21] Appl. No.: 484,015

[22] Filed: Feb. 23, 1990

[51] Int. Cl.⁵ .............................. G02B 1/00; F41G 7/00
[52] U.S. Cl. ................................ 350/96.10; 350/96.24; 244/3.12; 244/3.16
[58] Field of Search ............... 350/96.10, 96.22, 96.29, 350/96.24, 96.23; 244/3.12, 3.16; 242/170, 171, 172, 16, 17

[56] References Cited

U.S. PATENT DOCUMENTS

| | | | |
|---|---|---|---|
| 3,156,185 | 11/1964 | Hermann et al. | 244/3.12 X |
| 3,286,947 | 11/1966 | Erickson | 244/3.12 X |
| 3,319,781 | 5/1967 | Simpson et al. | 244/3.12 X |
| 3,613,619 | 10/1971 | de Nobel et al. | 244/3.12 X |
| 3,652,034 | 3/1972 | Schindler et al. | 244/3.12 X |
| 4,165,876 | 8/1979 | Pasqualini | 244/3.12 X |
| 4,624,184 | 11/1986 | Emerson | 244/3.12 X |
| 4,796,833 | 1/1989 | Pinson | 244/3.12 |
| 4,883,337 | 11/1989 | Dahlgren | 350/96.29 |
| 4,907,763 | 3/1990 | Pinson | 244/3.12 |

FOREIGN PATENT DOCUMENTS

| | | | |
|---|---|---|---|
| 0342525 | 11/1989 | European Pat. Off. | 244/3.12 X |
| 2815799 | 10/1979 | Fed. Rep. of Germany | 244/3.12 X |

Primary Examiner—Brian Healy
Attorney, Agent, or Firm—R. M. Heald; C. D. Brown; W. K. Denson-Low

[57] ABSTRACT

An optical fiber data link (14) between a missile (12) and a moving platform (10) launch site has a wound stack canister (16) on the platform and a second canister (18) that is aboard the missile. A first version of the platform canister (16) locates the wound stack (20) within an enclosure (26) with the fiber being payed out through an opening (28) in the enclosure which has a curved flared edge portion (30). In yet another version, the platform canister (32) is mounted within a gimbal (38) enabling the fiber payout direction to follow a path that does not result in damage to the fiber.

9 Claims, 3 Drawing Sheets

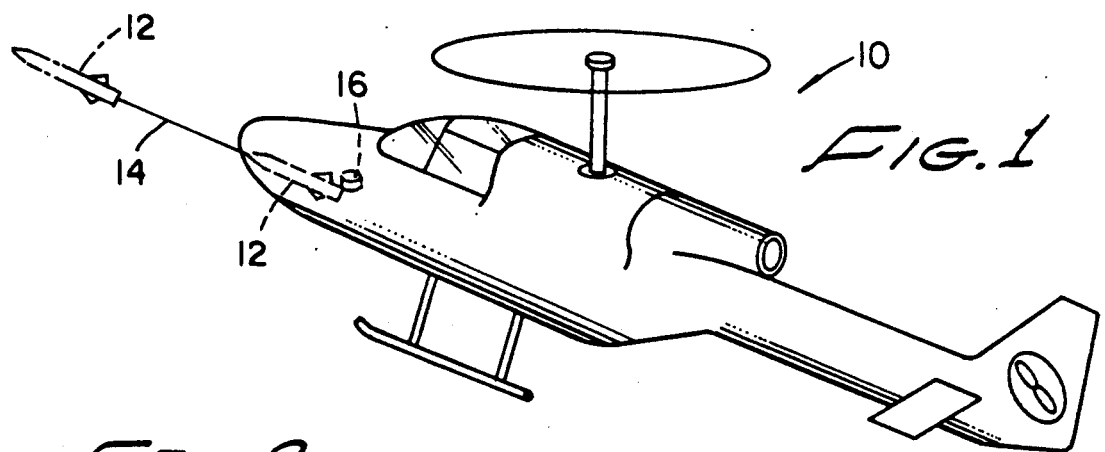
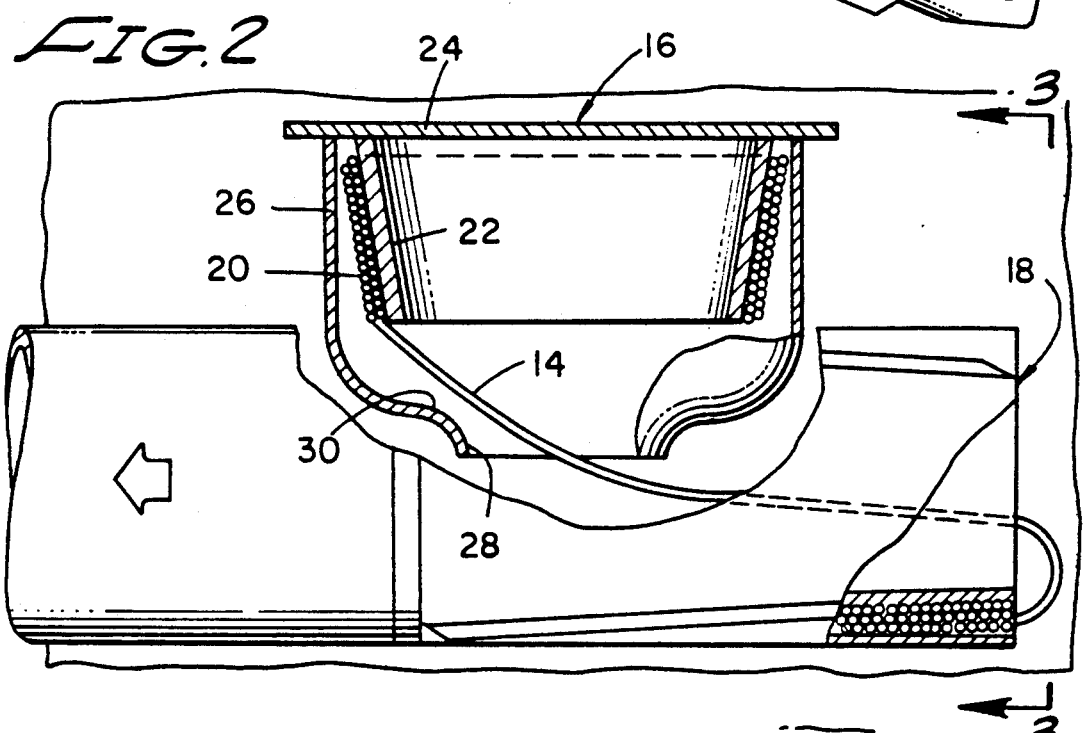
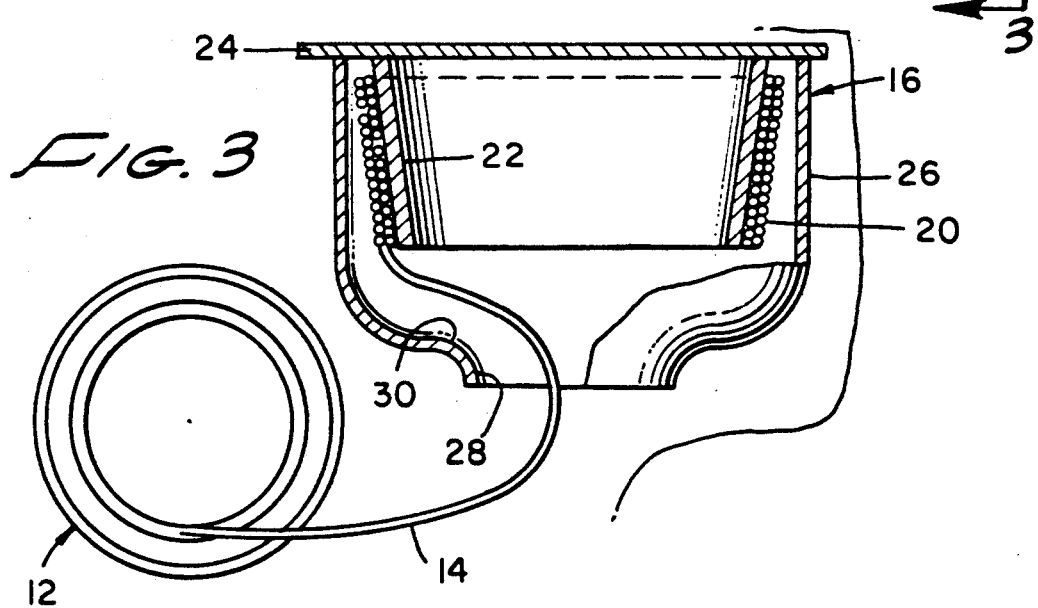

MULTI-DIRECTIONAL PAYOUT FIBER OPTIC CANISTER

BACKGROUND OF THE INVENTION

1. Field of the Invention

The present invention relates generally to the dispensing of optical fiber, and, more particularly, to an optical fiber canister which permits payout of the fiber in a plurality of different directions.

2. Description of Related Art

A data link for a missile or other airborne vehicle, for example, consists of a length of a filament such as wire, or, preferably an optical fiber wound onto a canister and which is dispensed upon launch of the missile. One end of the filament is connected to control apparatus aboard the missile while the other end is connected to equipment located at the launch site.

On launch, the optical fiber must be dispensed in such a manner as not to exceed its inherent tensile capabilities and not be kinked or bent to such an extent that the transmission of an optical signal will be adversely affected.

Dispensing of an optical fiber is especially difficult where the missile is launched from a moving vehicle, such as a helicopter, which may, for a variety of reasons, immediately change direction. Maneuvering to a new heading changes the fiber dispensing direction which, if not compensated for in some manner, may produce a detrimental effect on the fiber as it is being payed out. Moreover, on launching from a moving platform, such as a helicopter, it is considered necessary in order to prevent pulling with excessive force against the fiber, that there not only be a dispensing canister on the missile but also a second one on the aircraft.

It would be highly desirable to provide a data link dispensing system for use with a helicopter which would enable increasing the allowed range of maneuverabilty after launch of the missile without resulting in severing the optical fiber data link or impairing light signals transmitted over the fiber.

SUMMARY OF THE INVENTION

In accordance with the present invention, the data link includes a length of optical fiber which is wound into a helical stack and either fixedly or rotatably mounted to the missile, the inner end of the fiber being connected in a conventional manner to onboard control apparatus. The outer end of the data link fiber extends from the missile in a loop and has the end wound onto a canister located aboard the launch aircraft, e.g., helicopter. By the use of two dispensing canisters, one on the missile and the other aboard the aircraft, at missile launch tension on the fiber is reduced to a minimum thereby avoiding the possibility of fiber breakage or distention to the point resulting in optical signal deterioration.

In one version of the invention, the canister aboard the aircraft is generally vertically mounted with respect to the aircraft fuselage and is located within a housing having an opening defined by a 360 degree flared wall through which the fiber dispenses. Subsequent to launch, craft maneuvering is possible since the flared opening will accommodate a substantial angular change in heading without inducing additional stress or bending on the fiber.

In another embodiment, the onboard canister is mounted to a gimbal which accommodates change in payout direction upon platform change.

In any of the different forms of the invention, after missile launch the aircraft (moving platform) may be maneuvered over a wide range without exposing the optical fiber to unduly high stresses that will break it or reduce transmitted signal quality.

DESCRIPTION OF THE DRAWING

In the accompanying drawings:

FIG. 1 is a perspective view of a missile being launched from a helicopter with a filamentary data link therebetween;

FIG. 2 is a side elevational, sectional view taken through the canister of the invention aboard the aircraft;

FIG. 3 is a further end elevational, sectional view taken along the line 3—3 of FIG. 2;

DESCRIPTION OF PREFERRED EMBODIMENTS

Figure 4:
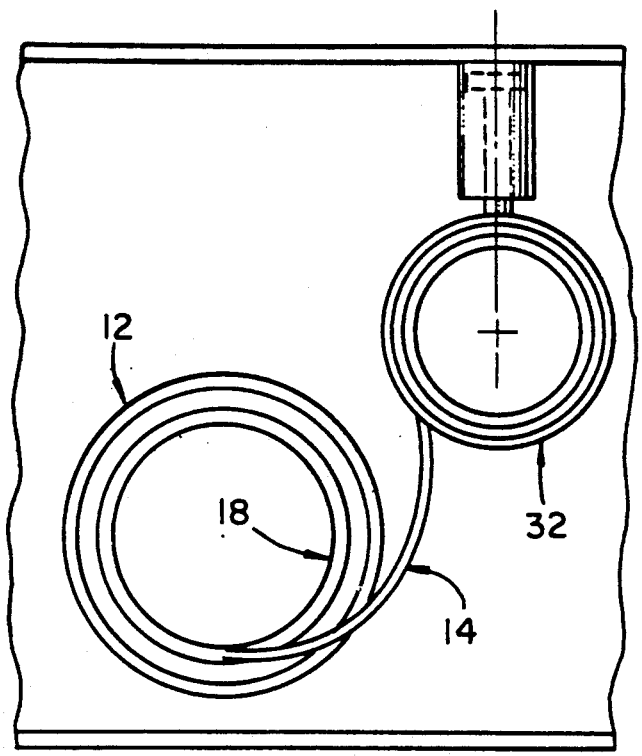
FIG. 4 shows a schematic view depicting relative positions of the two canisters prior to launch.

FIG. 1 of the drawing shows a helicopter 10 which has just launched a missile 12 from the craft to a position forwardly of the craft and which is still interconnected via a data link preferably consisting of a length of optical fiber 14. More particularly, as will be described, in order to prevent severing the fiber data link upon launch, the fiber is dispensed from two wound stack canisters, one located aboard the craft at 16 and the other on the missile identified as 18 (FIG. 2). Also, as will be more particularly shown, the manner of dispensing the fiber from the helicopter and the apparatus used to accomplish this is such as to enable the helicopter to maneuver after missile launch without damaging the data link fiber or reducing the quality of the light signal transmitted along the fiber.

For the detailed construction and arrangement of a first version of the present invention, reference is made simultaneously to both FIGS. 2 and 3. The canister 16 includes a fiber 14 which is wound into a stack 20 laid down onto the outer surface of a tapered, cylindrical drum 22, the fiber being maintained in a unitary condition by the addition of a suitable adhesive during winding of the stack.

The drum 22 has one end secured to a plate 24 conveniently mounted to the aircraft. A generally cylindrical enclosure 26 has one end also secured to the plate 24 with the enclosure walls surrounding the drum and laterally spaced from the fiber stack 20. The opposite end of the enclosure includes an opening 28 of generally circular geometry defined by smoothly curved wall portions which flare outwardly at 30. The cylindrical axes of the drum and enclosure substantially coincide and the fiber dispenses through the opening 28.

Preferably, the drum cylindrical axis is mounted so as to be vertical when the aircraft is in horizontal flight. Also, as shown in FIG. 2 the enclosure opening 28 is disposed in a downward facing direction with the missile oriented generally parallel to the aircraft line of flight.

On launch, the missile leaves the aircraft, typically in a forward direction as shown in FIG. 1, and this movement initiates dispensing of fiber 14 from both the aircraft canister 16 as well as the missile canister 18. In this way, the data link is maintained throughout the required part of the missile flight path. Not only does the enclosure flared opening 28 enable satisfactory fiber dispensing during normal missile launching, but by virtue of the fact that the opening is flared throughout 360 degrees, the aircraft can maneuver to a different course after missile launch without severing or damaging the data link.

Figure 6:
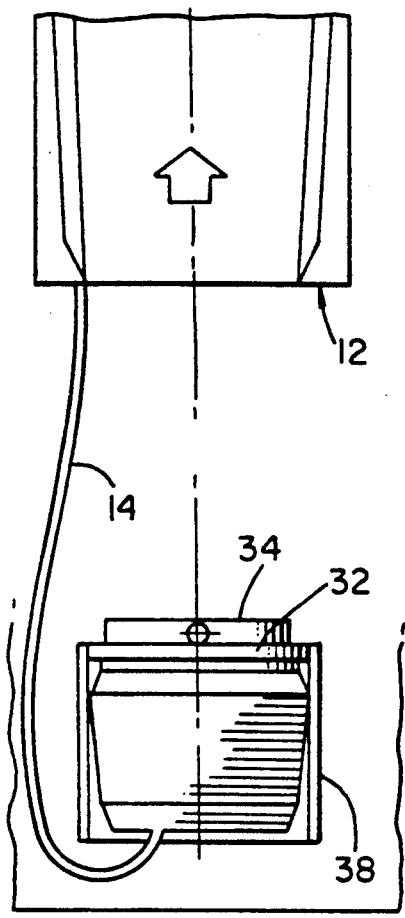
FIG. 6 shows the apparatus of FIG. 5 just after launch and the dispensing from the two canisters being initiated.
Figure 5:
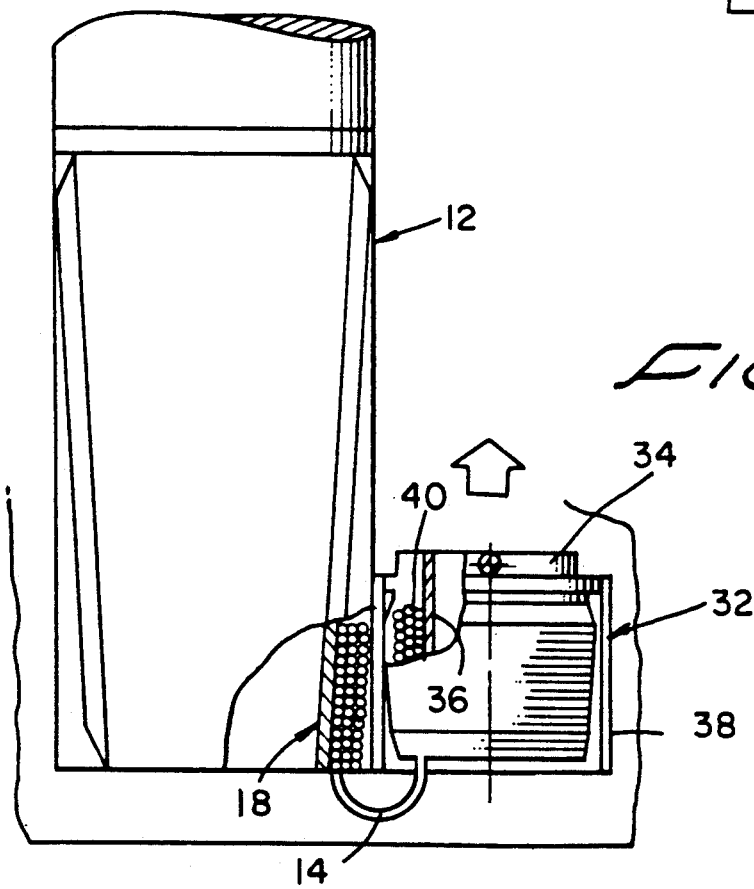
FIG. 5 shows a side elevational, partially fragmentary view of an alternative embodiment prior to missile launch.
Figure 7:
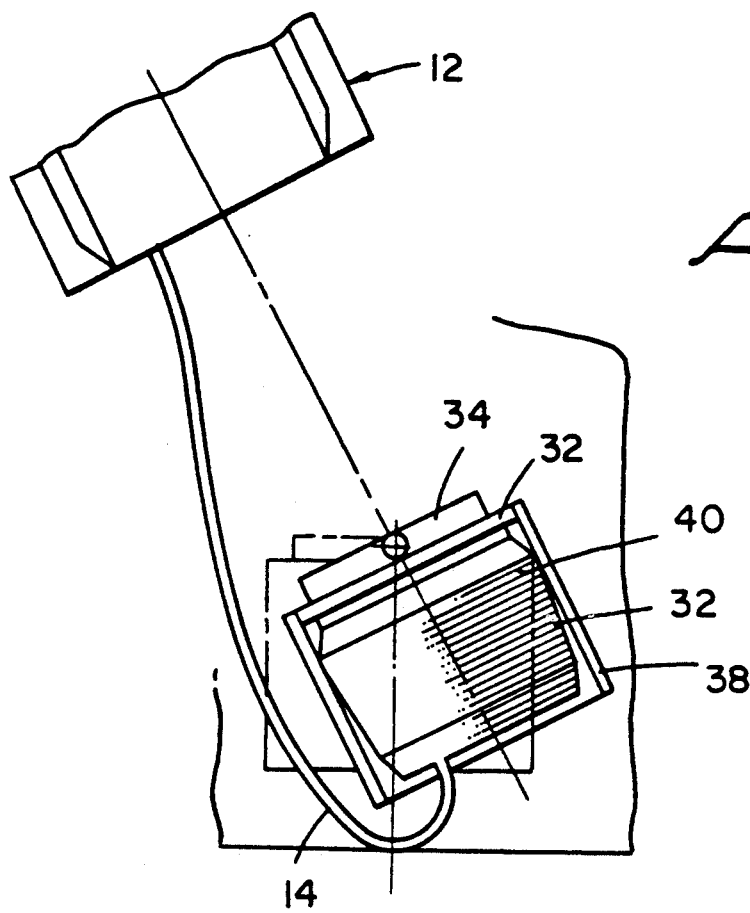
FIG. 7 shows a view similar to FIG. 6 where the launch aircraft has maneuvered to a new position.
Figure 8:
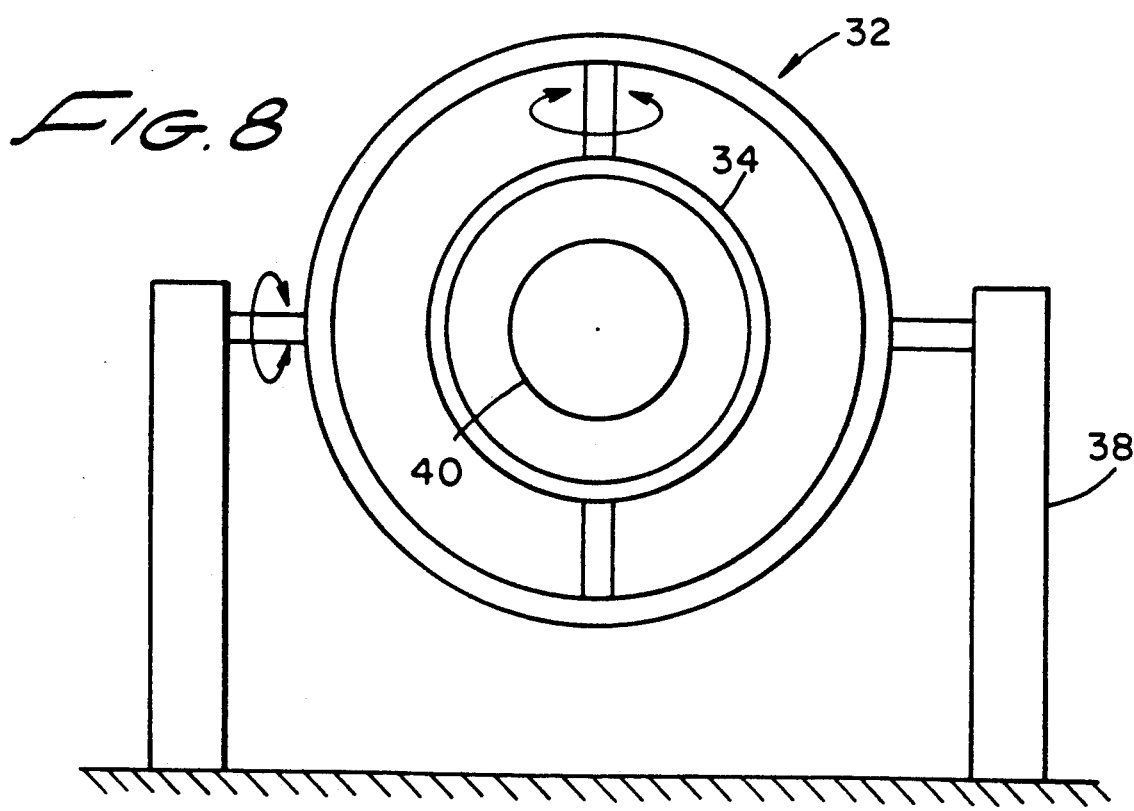
FIG. 8 is an end elevational view of a gimbal mounted canister.

In connection with the following description of an alternative embodiment of the invention, reference is made to FIGS. 5 through 7. The missile 12 with included canister 18 can be identical to that described used in the first version. The canister for mounting aboard the helicopter is identified generally as 32 and includes a hollow cylindrical body 34 with an open end 36. The cylindrical body 34 is mounted within a gimbal 38 which, in turn, is fixedly secured to the aircraft (FIG. 8) and provides automatic position adjustment for the body 34 and included wound stack. The fiber 14 is wound into a stack located within the cylindrical body which is depicted as an outside payout stack 40. On launch, the missile 12 moves from the FIG. 5 position to that shown in FIG. 6 with fiber payout initiating and substantially little or no movement of canister 32. On the aircraft maneuvering to a new heading as depicted in FIG. 7, the gimbal turns to accommodate the heading change resulting in fiber dispensing being maintained directly out the open end 46 which avoids torquing or kinking of the fiber.

Although the present invention is described in connection with preferred embodiments, it is to be understood that those skilled in the appertaining art may make changes which will be within the spirit of the invention and be within the ambit of the appended claims.

What is claimed is:

1. An optical fiber data link for interconnecting a missile launched from a moving platform, comprising:
   a first dispensing canister mounted to the missile on which a first optical fiber end portion is formed into a stack;
   a second dispensing canister mounted to the moving platform including,
   a further stack formed from the opposite end portion of the fiber, and
   an enclosure having a single opening in the enclosure bottom with enclosure walls defining the opening being flared outwardly forming smooth curved surfaces facing the fiber dispensed through the opening.

2. An optical fiber data link as in claim 1, in which the enclosure and further stack are fixedly mounted to the aircraft.

3. An optical fiber data link as in claim 1, in which the further stack and enclosure are each generally cylindrical, the cylindrical axes of both being arranged substantially normal to the moving platform direction of movement.

4. Optical fiber dispensing apparatus for use on a moving platform to form a missile data link, comprising:
   a drum on which a length of the optical fiber is wound in a stack;
   a hollow generally cylindrical enclosure within which the drum and wound stack are mounted, said enclosure having an opening through which the fiber passes on payout; and
   gimbal means mounting the enclosure to the moving platform for providing the ability to reorient the enclosure and drum throughout a substantial solid angle.

5. Optical fiber dispensing apparatus as in claim 4, in which a substantial loop of fiber is formed outwardly of the enclosure prior to missile launch.

6. Optical fiber dispensing apparatus as in claim 4, in which the enclosure opening through which the fiber passes on payout faces in a direction opposite to that of the missile launch direction.

7. An optical fiber data link for a helicopter launched missile, comprising:
   a dispensing canister aboard the missile on which a first optical fiber end portion is wound into a stack;
   a further dispensing canister carried by the helicopter including,
   a drum on which an opposiste end portion of the optical fiber is wound;
   a hollow generally cylindrical enclosure within which the fiber wound drum is mounted, said enclosure having an opening through which the fiber passes on payout; and
   a gimbal mounting for the enclosure providing the ability to reorient the enclosure and wound drum throughout a substantial solid angle.

8. Optical fiber data link as in claim 7, in which a substantial loop of fiber is formed outwardly of the enclosure prior to missile launch.

9. Optical fiber data link as in claim 7, in which the enclosure opening through which the fiber passes on payout faces in a direction opposite to that of the missile launch direction.

* * * * *